US011044731B2

(12) United States Patent
Xu et al.

(10) Patent No.: US 11,044,731 B2
(45) Date of Patent: Jun. 22, 2021

(54) DATA TRANSMISSION METHOD, DEVICE, AND SYSTEM

(71) Applicant: Huawei Technologies Co., Ltd., Shenzhen (CN)

(72) Inventors: Xiaoying Xu, Shanghai (CN); Xiaoxiao Zheng, Shanghai (CN); Tianle Deng, Shanghai (CN)

(73) Assignee: Huawei Technoiogies Co., Ltd., Shenzhen (CN)

( * ) Notice: Subject to any disclaimer, the term of this patent is extended or adjusted under 35 U.S.C. 154(b) by 0 days.

(21) Appl. No.: 15/899,034

(22) Filed: Feb. 19, 2018

(65) Prior Publication Data

US 2018/0176926 A1 Jun. 21, 2018

Related U.S. Application Data

(63) Continuation of application No. PCT/CN2016/096092, filed on Aug. 19, 2016.

(30) Foreign Application Priority Data

Aug. 19, 2015 (WO) ................ PCT/CN2015/087544

(51) Int. Cl.
*H04W 72/08* (2009.01)
*H04W 72/04* (2009.01)
(Continued)

(52) U.S. Cl.
CPC ..... *H04W 72/085* (2013.01); *H04W 28/0231* (2013.01); *H04W 72/0486* (2013.01); *H04W 74/08* (2013.01); *H04W 72/0413* (2013.01)

(58) Field of Classification Search
CPC . H04W 72/0413; H04W 74/08; H04W 16/14; H04W 28/0221; H04W 28/0252;
(Continued)

(56) References Cited

U.S. PATENT DOCUMENTS

2007/0097928 A1* 5/2007 Anderson ............. H04L 5/0037
370/335
2008/0139133 A1* 6/2008 Usuda .................... H04L 47/10
455/95
(Continued)

FOREIGN PATENT DOCUMENTS

CN 101132225 A 2/2008
CN 101164361 A 4/2008
(Continued)

OTHER PUBLICATIONS

3GPP TR 23.887 V12.0.0 (Dec. 2013); "3rd Generation Partnership Project; Technical Specification Group Services and System Aspects; Study on Machine-Type Communications (MTC) and other mobile data applications communications enhancements (Release 12)"; 151 pages.

*Primary Examiner* — Awet Haile
(74) *Attorney, Agent, or Firm* — Slater Matsol, LLP

(57) ABSTRACT

A data transmission method, a device and a system are disclosed. In an embodiment the data method includes obtaining, by UE, first information, where the first information includes at least one of a location information of the UE, a channel quality between the UE and a base station, a channel load between the UE and the base station, a size of data to be sent by the UE, or an uplink service arrival sparseness degree of the base station, determining, by the UE, whether the first information meets a preset condition, and, when the first information does not meet the preset condition, obtaining, by the UE, an unscheduled uplink data transmission resource, and sending data to the base station by using the unscheduled uplink data transmission resource.

12 Claims, 9 Drawing Sheets

(51) Int. Cl.
*H04W 28/02* (2009.01)
*H04W 74/08* (2009.01)

(58) Field of Classification Search
CPC ......... H04W 52/0216; H04W 52/0222; H04W
72/085; H04W 72/10; H04W 72/1242;
H04W 74/006; H04W 74/0808; H04W
24/10; H04W 28/0231; H04W 4/02;
H04W 72/0486; H04W 72/1268; H04W
74/008; H04W 74/04; H04W 74/0816;
H04L 47/14; H04L 47/24; H04L 47/30;
H04L 1/00; H04L 5/0007; H04L 5/0042;
H04L 5/0064; H04L 5/0096
See application file for complete search history.

(56) References Cited

U.S. PATENT DOCUMENTS

| | | | |
|---|---|---|---|
| 2008/0316959 A1* | 12/2008 | Bachl | H04W 72/1284 370/329 |
| 2011/0111784 A1 | 5/2011 | Seo et al. | |
| 2012/0033613 A1 | 2/2012 | Lin et al. | |
| 2012/0063307 A1* | 3/2012 | He | H04W 74/0841 370/230 |
| 2014/0078985 A1 | 3/2014 | Kanamarlapudi et al. | |
| 2014/0376467 A1* | 12/2014 | Liu | H04W 72/02 370/329 |
| 2015/0065133 A1* | 3/2015 | Cui | H04W 36/30 455/436 |
| 2015/0078294 A1* | 3/2015 | Yang | H04W 72/048 370/329 |
| 2015/0111569 A1* | 4/2015 | Gupta | H04L 65/1069 455/426.1 |
| 2015/0341823 A1* | 11/2015 | Kanamarlapudi | H04W 28/0252 370/230 |
| 2016/0066195 A1* | 3/2016 | Moon | H04W 16/14 455/454 |
| 2016/0081115 A1 | 3/2016 | Pang et al. | |
| 2016/0205591 A1* | 7/2016 | Hong | H04W 28/08 370/235 |
| 2017/0041901 A1* | 2/2017 | Karaki | H04W 48/18 |
| 2018/0124821 A1* | 5/2018 | Sutivong | H04W 52/04 |

FOREIGN PATENT DOCUMENTS

| | | |
|---|---|---|
| CN | 101345647 A | 1/2009 |
| CN | 101360340 A | 2/2009 |
| CN | 101369956 A | 2/2009 |
| CN | 101472331 A | 7/2009 |
| CN | 101489258 A | 7/2009 |
| CN | 102647756 A | 8/2012 |
| EP | 1865735 A1 | 12/2007 |
| EP | 2320692 B1 | 6/2013 |
| EP | 2716122 A1 | 4/2014 |
| KR | 20100026033 A | 3/2010 |
| WO | 2012160510 A1 | 11/2012 |

* cited by examiner

DATA TRANSMISSION METHOD, DEVICE, AND SYSTEM

CROSS-REFERENCE TO RELATED APPLICATIONS

This application is a continuation of International Application No. PCT/CN2016/096092, filed on Aug. 19, 2016, which claims priority to International application No. PCT/CN2015/087544, filed on Aug. 19, 2015. The disclosures of the aforementioned applications are hereby incorporated by reference in their entireties.

TECHNICAL FIELD

The present application relates to communication technologies, and in particular, to a method, device and system for data transmission.

BACKGROUND

As mobile intelligent terminals and machine-to-machine (M2M) technologies are widely used, the number of small data packets transmitted between mobile intelligent terminals increases. Transmission of small data packets between mobile intelligent terminals means that a very small amount of data is transmitted between mobile intelligent terminals each time. This data is transmitted at fixed time intervals and the mobile intelligent terminals are in an idle state when no data is transmitted.

When transmitting small data packets, conventional user equipment (UE) typically chooses a random access scheme: the UE chooses a random access resource to initiate a random access request to a base station, and the random access request carries a random preamble sequence. The base station sends a random access response to the UE after receiving the random access request sent by the UE, and the random access response includes a random preamble sequence. If the random preamble sequence sent to the base station by the UE is the same as the random preamble sequence received by the UE, after receiving the random access response sent by the base station, the UE sends a radio resource control (RRC) access request to the base station. Then, the base station sends an RRC access response to the UE. In this way, a radio link is established between the UE and the base station and a subsequent data transmission process is performed.

However, when the random access scheme is chosen by the existing UE for data transmission, a large quantity of signaling interactions are needed, and a relatively large quantity of network resources are occupied, thereby causing low transmission efficiency.

SUMMARY

Embodiments of the present application provide a method, device and system for data transmission so that signaling interactions during the data transmission can be reduced and fewer network resources are used. This advantageously improves transmission efficiency.

According to a first aspect, an embodiment of the present application provides a data transmission method, including obtaining, by user equipment (UE), first information, where the first information includes at least one of location information of the UE, channel quality between the UE and a base station, channel load between the UE and the base station, a size of data to be sent by the UE, or an uplink service arrival sparseness degree of the base station; determining, by the UE, whether the first information meets a preset condition; and when the first information does not meet the preset condition, obtaining, by the UE, an unscheduled uplink data transmission resource, and sending data to the base station by using the unscheduled uplink data transmission resource.

With reference to the first aspect, in a first possible implementation of the first aspect, when the first information includes the location information of the UE, determining, by the UE, whether the first information meets a preset condition includes determining, by the UE, whether a location of the UE is on a coverage edge of the base station; or when the first information includes the channel quality between the UE and the base station, determining, by the UE, whether the first information meets a preset condition includes determining, by the UE, whether the channel quality between the UE and the base station is less than a first preset threshold; or when the first information includes the channel load between the UE and the base station, determining, by the UE, whether the first information meets a preset condition includes determining, by the UE, whether the channel load between the UE and the base station is greater than a second preset threshold; or when the first information includes the size of the data to be sent by the UE, determining, by the UE, whether the first information meets a preset condition includes determining, by the UE, whether the size of the data to be sent by the UE is greater than a third preset threshold; or when the first information includes the uplink service arrival sparseness degree of the base station, determining, by the UE, whether the first information meets a preset condition includes determining, by the UE, whether the uplink service arrival sparseness degree of the base station is greater than a fourth preset threshold.

With reference to the first possible implementation of the first aspect, in a second possible implementation of the first aspect, the first information further includes a quantity of times that the UE fails to send a data packet to the base station by using the unscheduled uplink data transmission resource; then, determining, by the UE, whether the first information meets a preset condition further includes determining, by the UE, whether the quantity of times that the UE fails to send a data packet to the base station by using the unscheduled uplink data transmission resource is greater than a seventh preset threshold.

With reference to the first possible implementation or the second possible implementation of the first aspect, in a third possible implementation of the first aspect, before obtaining, by UE, first information, the method further includes obtaining, by the UE, at least one of the first preset threshold, the second preset threshold, the third preset threshold, the fourth preset threshold, or the seventh preset threshold that is preset in the UE; or receiving, by the UE, at least one of the first preset threshold, the second preset threshold, the third preset threshold, the fourth preset threshold, or the seventh preset threshold that is broadcast by the base station.

According to a second aspect, an embodiment of the present application further provides a data transmission method, including receiving, by a base station, data that is sent by user equipment (UE) by using an unscheduled uplink data transmission resource after the UE determines that the first information does not meet a preset condition, where the first information includes at least one of location information of the UE, channel quality between the UE and the base station, channel load between the UE and the base station, a size of data to be sent by the UE, or an uplink service arrival sparseness degree of the base station.

With reference to the second aspect, in a first possible implementation of the second aspect, the first information further includes a quantity of times that the UE fails to send a data packet to the base station by using the unscheduled uplink data transmission resource.

With reference to the second aspect and the first possible implementation of the second aspect, in a second possible implementation of the second aspect, before receiving, by a base station, data that is sent by the UE by using an unscheduled uplink data transmission resource after the UE determines that first information does not meet a preset condition, the method further includes broadcasting, by the base station, at least one of a first preset threshold, a second preset threshold, a third preset threshold, a fourth preset threshold, or a seventh preset threshold, where the first preset threshold is used to indicate a minimum value of the channel quality between the UE and the base station, the second preset threshold is used to indicate a maximum value of the channel load between the UE and the base station, the third preset threshold is used to indicate a maximum value of the size of the data to be sent by the UE, the fourth preset threshold is used to indicate a maximum value of the uplink service arrival sparseness degree of the base station, and the seventh preset threshold is used to indicate a maximum value of the quantity of times that the UE fails to send a data packet to the base station by using the unscheduled uplink data transmission resource.

According to a third aspect, an embodiment of the present application provides a user equipment (UE) including an obtaining module configured to obtain first information, where the first information includes at least one of location information of the UE, channel quality between the UE and a base station, channel load between the UE and the base station, a size of data to be sent by the UE, or an uplink service arrival sparseness degree of the base station; a determining module configured to determine whether the first information meets a preset condition; and a sending module configured to, when the first information does not meet the preset condition, obtain an unscheduled uplink data transmission resource, and send data to the base station by using the unscheduled uplink data transmission resource.

With reference to the third aspect, in a first possible implementation of the third aspect, the determining module is configured to, when the first information includes the location information of the UE, determine whether a location of the UE is on a coverage edge of the base station; when the first information includes the channel quality between the UE and the base station, determine whether the channel quality between the UE and the base station is less than a first preset threshold; when the first information includes the channel load between the UE and the base station, determine whether the channel load between the UE and the base station is greater than a second preset threshold; when the first information includes the size of the data to be sent by the UE, determine whether the size of the data to be sent by the UE is greater than a third preset threshold; or when the first information includes the uplink service arrival sparseness degree of the base station, determine whether the uplink service arrival sparseness degree of the base station is greater than a fourth preset threshold.

With reference to the first possible implementation of the third aspect, in a second possible implementation of the third aspect, the first information further includes a quantity of times that the UE fails to send a data packet to the base station by using the unscheduled uplink data transmission resource; and wherein the determining module is further configured to determine whether the quantity of times that the UE fails to send a data packet to the base station by using the unscheduled uplink data transmission resource is greater than a seventh preset threshold.

With reference to the first possible implementation or the second possible implementation of the third aspect, in a third possible implementation of the third aspect, before the obtaining module obtains the first information, the obtaining module is configured to obtain at least one of the first preset threshold, the second preset threshold, the third preset threshold, the fourth preset threshold, or the seventh preset threshold that is preset in the UE; or the obtaining module further includes a receiving submodule configured to receive, before the obtaining module obtains the first information, at least one of the first preset threshold, the second preset threshold, the third preset threshold, the fourth preset threshold, or the seventh preset threshold that is broadcast by the base station.

According to a fourth aspect, an embodiment of the present application provides a base station including a receiving module configured to receive data that is sent by user equipment (UE) by using an unscheduled uplink data transmission resource after the UE determines that first information does not meet a preset condition, where the first information includes at least one of location information of the UE, channel quality between the UE and the base station, channel load between the UE and the base station, a size of data to be sent by the UE, or an uplink service arrival sparseness degree of the base station.

With reference to the fourth aspect, in a first possible implementation of the fourth aspect, the first information further includes a quantity of times that the UE fails to send a data packet to the base station by using the unscheduled uplink data transmission resource.

With reference to the fourth aspect and the first possible implementation of the fourth aspect, in a second possible implementation of the fourth aspect, the base station further includes a broadcasting module configured to broadcast at least one of a first preset threshold, a second preset threshold, a third preset threshold, a fourth preset threshold, or a seventh preset threshold before the receiving module receives the data that is sent by the user equipment (UE) by using the unscheduled uplink data transmission resource after the UE determines that the first information does not meet the preset condition, where the first preset threshold is used to indicate a minimum value of the channel quality between the UE and the base station, the second preset threshold is used to indicate a maximum value of the channel load between the UE and the base station, the third preset threshold is used to indicate a maximum value of the size of the data to be sent by the UE, the fourth preset threshold is used to indicate a maximum value of the uplink service arrival sparseness degree of the base station, and the seventh preset threshold is used to indicate a maximum value of the quantity of times that the UE fails to send a data packet to the base station by using the unscheduled uplink data transmission resource.

According to a fifth aspect, an embodiment of the present application provides user equipment (UE) including a receiver configured to obtain first information, where the first information includes at least one of location information of the UE, channel quality between the UE and a base station, channel load between the UE and the base station, a size of data to be sent by the UE, or an uplink service arrival sparseness degree of the base station; a processor configured to determine whether the first information meets a preset condition; and a transmitter configured to, when the first information does not meet the preset condition, obtain an unscheduled uplink data transmission resource, and send data to the base station by using the unscheduled uplink data transmission resource.

With reference to the fifth aspect, in a first possible implementation of the fifth aspect, the processor is configured to when the first information includes the location information of the UE, determine whether a location of the UE is on a coverage edge of the base station; when the first information includes the channel quality between the UE and the base station, determine whether the channel quality between the UE and the base station is less than a first preset threshold; when the first information includes the channel load between the UE and the base station, determine whether the channel load between the UE and the base station is greater than a second preset threshold; when the first information includes the size of the data to be sent by the UE, determine whether the size of the data to be sent by the UE is greater than a third preset threshold; or when the first information includes the uplink service arrival sparseness degree of the base station, determine whether the uplink service arrival sparseness degree of the base station is greater than a fourth preset threshold.

With reference to the first possible implementation of the fifth aspect, in a second possible implementation of the fifth aspect, the first information further includes a quantity of times that the UE fails to send a data packet to the base station by using the unscheduled uplink data transmission resource; and the processor is further configured to determine whether the quantity of times that the UE fails to send a data packet to the base station by using the unscheduled uplink data transmission resource is greater than a seventh preset threshold.

With reference to the first possible implementation or the second possible implementation of the fifth aspect, in a third possible implementation of the fifth aspect, the receiver is configured to: before the receiver obtains the first information, obtain at least one of the first preset threshold, the second preset threshold, the third preset threshold, the fourth preset threshold, or the seventh preset threshold that is preset in the UE; or receive at least one of the first preset threshold, the second preset threshold, the third preset threshold, the fourth preset threshold, or the seventh preset threshold that is broadcast by the base station.

According to a sixth aspect, an embodiment of the present application provides a base station, including a receiver configured to receive data that is sent by user equipment (UE) by using an unscheduled uplink data transmission resource after the UE determines that first information does not meet a preset condition, where the first information includes at least one of location information of the UE, channel quality between the UE and the base station, channel load between the UE and the base station, a size of data to be sent by the UE, or an uplink service arrival sparseness degree of the base station.

With reference to the sixth aspect, in a first possible implementation of the sixth aspect, the first information further includes a quantity of times that the UE fails to send a data packet to the base station by using the unscheduled uplink data transmission resource.

With reference to the sixth aspect and the first possible implementation of the sixth aspect, in a second possible implementation of the sixth aspect, the base station further includes a transmitter configured to broadcast at least one of a first preset threshold, a second preset threshold, a third preset threshold, a fourth preset threshold, or a seventh preset threshold before the receiver receives the data that is sent by the user equipment (UE) by using the unscheduled uplink data transmission resource after the UE determines that the first information does not meet the preset condition, where the first preset threshold is used to indicate a minimum value of the channel quality between the UE and the base station, the second preset threshold is used to indicate a maximum value of the channel load between the UE and the base station, the third preset threshold is used to indicate a maximum value of the size of the data to be sent by the UE, the fourth preset threshold is used to indicate a maximum value of the uplink service arrival sparseness degree of the base station, and the seventh preset threshold is used to indicate a maximum value of the quantity of times that the UE fails to send a data packet to the base station by using the unscheduled uplink data transmission resource.

According to a seventh aspect, an embodiment of the present application provides a data transmission system, including the user equipment (UE) according to any implementation of the third aspect, and the base station according to any implementation of the fourth aspect.

According to an eighth aspect, an embodiment of the present application provides a data transmission system, including the user equipment (UE) according to any one of the fifth aspect, and the base station according to any one of the sixth aspect.

According to the data transmission method, device and system provided in the embodiments of the present application, the UE obtains the first information, where the first information includes at least one of the location information of the UE, the channel quality between the UE and the base station, the channel load between the UE and the base station, the size of the data to be sent by the UE, or the uplink service arrival sparseness degree of the base station; the UE determines whether the first information meets the preset condition; and when the first information does not meet the preset condition, the UE obtains the unscheduled uplink data transmission resource, and sends data to the base station by using the unscheduled uplink data transmission resource.

Based on the foregoing description of the embodiments, the UE can directly obtain the unscheduled uplink data transmission resource, instead of using a random access scheme to perform a large quantity of signaling interactions with the base station, so that fewer network resources are used and transmission efficiency is improved.

BRIEF DESCRIPTION OF THE DRAWINGS

To describe the technical solutions in the embodiments of the present application more clearly, the following briefly describes the accompanying drawings required for describing the embodiments. Apparently, the accompanying drawings in the following description show merely some embodiments of the present application, and persons of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present application with reference to the accompanying drawings in the embodiments of the present application. Apparently, the described embodiments are merely some but not all of the embodiments of the present application. All other embodiments obtained by persons of ordinary skill in the art based on the embodiments of the present application without creative efforts shall fall within the protection scope of the present application.

Embodiment 1

Figure 1:
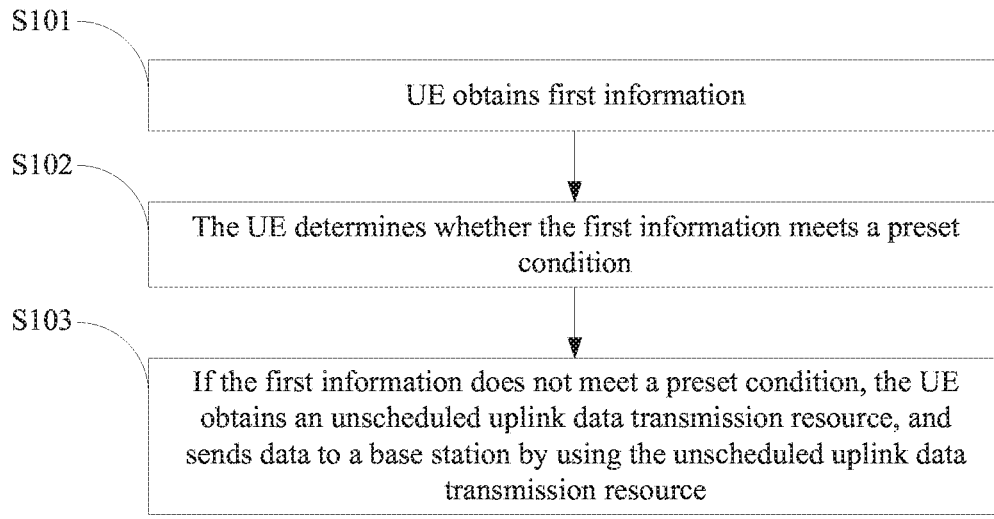
FIG. 1 is a schematic flowchart of a data transmission method according to Embodiment 1 of the present application.

This embodiment of the present application provides a data transmission method, as shown in FIG. 1.

S101. UE obtains first information.

The first information includes at least one of location information of the UE, channel quality between the UE and a base station, channel load between the UE and the base station, a size of data to be sent by the UE, or an uplink service arrival sparseness degree of the base station.

For example, if the first information is the location information of the UE, the UE obtains the first information in a manner that the UE determines the location information of the UE; if the first information is the channel quality between the UE and the base station, the channel load between the UE and the base station, or the uplink service arrival sparseness degree of the base station, the UE obtains the first information in a manner that the UE receives the first information sent by the base station; or if the first information is the size of the data to be sent by the UE, the UE obtains the first information in a manner that the UE directly reads the size of the data to be sent by the UE.

S102. The UE determines whether the first information meets a preset condition.

The first information includes at least one of the location information of the UE, the channel quality between the UE and the base station, the channel load between the UE and the base station, the size of the data to be sent by the UE, or the uplink service arrival sparseness degree of the base station.

Further, if the first information includes the location information of the UE, the UE determines whether the first information meets a preset condition by determining whether a location of the UE is on a coverage edge of the base station.

In another embodiment of the present application, if the first information includes the channel quality between the UE and the base station, the UE determines whether the first information meets a preset condition by determining whether the channel quality between the UE and the base station is less than a first preset threshold. If the channel quality between the UE and the base station is less than the first preset threshold, the UE determines that the first information does not meet the preset condition.

In another embodiment of the present application, if the first information includes the channel load between the UE and the base station, the UE determines whether the first information meets a preset condition by determining whether the channel load between the UE and the base station is greater than a second preset threshold. If the channel load between the UE and the base station is greater than the second preset threshold, the UE determines that the first information meets the preset condition; or if the channel load between the UE and the base station is not greater than the second preset threshold, the UE determines that the first information does not meet the preset condition.

In another embodiment of the present application, if the first information includes the size of the data to be sent by the UE, the UE determines whether the first information meets a preset condition by determining whether the size of the data to be sent by the UE is greater than a third preset threshold. If the size of the data to be sent by the UE is greater than the third preset threshold, the UE determines that the first information meets the preset condition; or if the size of the data to be sent by the UE is not greater than the third preset threshold, the UE determines that the first information does not meet the preset condition.

In another embodiment of the present application, if the first information includes the uplink service arrival sparseness degree of the base station, the UE determines whether the first information meets a preset condition by determining whether the uplink service arrival sparseness degree of the base station is greater than a fourth preset threshold. If the uplink service arrival sparseness degree of the base station is greater than the fourth preset threshold, the UE determines that the first information meets the preset condition; or if the uplink service arrival sparseness degree of the base station is not greater than the fourth preset threshold, the UE determines that the first information does not meet the preset condition. The uplink service arrival sparseness degree of the base station is a traffic amount of data transmitted between the base station and the UE in a unit time period.

For example, a method for the UE to determine whether the location of the UE is on the coverage edge of the base station may comprise the UE determines whether a remaining available power of the UE is less than a fifth preset threshold; or the UE determines whether a path loss between the UE and the base station is greater than a sixth preset threshold. If the remaining available power of the UE is less than the fifth preset threshold, the UE determines that the location of the UE is on the coverage edge of the base station; or if the remaining available power of the UE is not less than the fifth preset threshold, the UE determines that the location of the UE is not on the coverage edge of the base station. If the path loss between the UE and the base station is greater than the sixth preset threshold, the UE determines that the location of the UE is on the coverage edge of the base station; or if the path loss between the UE and the base station is not greater than the sixth preset threshold, the UE determines that the location of the UE is not on the coverage edge of the base station.

In another embodiment of the present application, the first information further includes a quantity of times that the UE fails to send a data packet to the base station by using the unscheduled uplink data transmission resource; and that the UE determines whether the first information meets a preset condition further includes: the UE determines whether the quantity of times that the UE fails to send a data packet to the base station by using the unscheduled uplink data transmission resource is greater than a seventh preset threshold. If the quantity of times that the UE fails to send a data packet to the base station by using the unscheduled uplink data transmission resource is greater than the seventh preset threshold, the UE determines that the first information meets the preset condition; or if the quantity of times that the UE fails to send a data packet to the base station by using the unscheduled uplink data transmission resource is less than or equal to the seventh preset threshold, the UE determines that the first information does not meet the preset condition. The seventh preset threshold is used to indicate a maximum value of the quantity of times that the UE fails to send a data packet to the base station by using the unscheduled uplink data transmission resource. In addition, the data packet sent to the base station by the UE by using the unscheduled uplink data transmission resource in this embodiment may be one data packet or a plurality of data packets that are sent in a period of time. This is not specifically limited in the present application.

It should be noted that, if the first information includes only one of the location information of the UE, the channel quality between the UE and the base station, the channel load between the UE and the base station, the size of the data to be sent by the UE, the uplink service arrival sparseness degree of the base station, or a quantity of times that the UE fails to send, by using the unscheduled uplink data transmission resource, one data packet to the base station or a plurality of data packets in a period of time to the base station, when determining whether the first information meets the preset condition, the UE needs to determine only whether the one piece of information meets a corresponding preset condition. If the first information includes at least two of the location information of the UE, the channel quality between the UE and the base station, the channel load between the UE and the base station, the size of the data to be sent by the UE, or the uplink service arrival sparseness degree of the base station, when determining whether the first information meets the preset condition, the UE needs to determine whether the at least two pieces of information included meet corresponding preset conditions. The first information is considered to meet the preset condition provided that one of the at least two pieces of information meets a corresponding preset condition.

S103. If the first information does not meet the preset condition, the UE obtains an unscheduled uplink data transmission resource, and sends data to a base station by using the unscheduled uplink data transmission resource.

If the first information does not meet the preset condition, the UE obtains the unscheduled uplink data transmission resource, and sends data to the base station by using the unscheduled uplink data transmission resource. Since the embodiment method is different from an existing random access scheme, the method does not need a large quantity of signaling interactions with the base station. Accordingly, fewer network resources are used and transmission efficiency is improved.

For example, when an unscheduled uplink data transmission resource is broadcast to the UE by the base station, after determining that the first information does not meet the preset condition, the UE selects one unscheduled uplink data transmission resource from unscheduled uplink data transmission resources that are received, and sends data to the base station by using the unscheduled uplink data transmission resource; or when an unscheduled uplink data transmission resource is sent to the UE by the base station by using dedicated signaling, after determining that the first information does not meet the preset condition, the UE sends data to the base station by using the unscheduled uplink data transmission resource. If the unscheduled uplink data transmission resource is sent to the UE by the base station by using the dedicated signaling, before determining that the first information does not meet the preset condition, the UE needs to obtain the unscheduled uplink data transmission resource.

For example, the UE sends data to the base station by using the unscheduled uplink data transmission resource. The unscheduled uplink data transmission resource may be a resource used for a physical uplink shared channel, and the resource is allocated to the UE by the base station by using a system broadcast message or another dedicated message; or the unscheduled uplink data transmission resource may alternatively be an unscheduled uplink data transmission resource agreed on in a communications protocol by the UE and the base station. This is not limited in the present application.

It should be noted that, if the first information meets the preset condition, the UE initiates a random access request, a scheduling request, or a buffer status report, to request an uplink scheduled resource from the base station, and sends data to the base station by using the uplink scheduled resource.

For example, a process in which the UE initiates the random access request, the scheduling request, or the buffer status report, to request the uplink scheduled resource from the base station, and sends data to the base station by using the uplink scheduled resource is the same as an existing random access process, and details are not described herein again.

Optionally, before the UE obtains the first information, the UE may further obtain at least one of the first preset threshold, the second preset threshold, the third preset threshold, the fourth preset threshold, the fifth preset threshold, the sixth preset threshold, or the seventh preset threshold.

Optionally, the UE may receive at least one of the first preset threshold, the second preset threshold, the third preset threshold, the fourth preset threshold, the fifth preset threshold, the sixth preset threshold, or the seventh preset threshold that is broadcast by the base station; or the at least one of the first preset threshold, the second preset threshold, the third preset threshold, the fourth preset threshold, the fifth preset threshold, the sixth preset threshold, or the seventh preset threshold may be preconfigured in the UE. If the first preset threshold, the second preset threshold, the third preset threshold, the fourth preset threshold, the fifth preset threshold, the sixth preset threshold, or the seventh preset threshold is preconfigured in the UE, the base station does not need to broadcast these thresholds.

It should be additionally noted that, whether the UE chooses to use the data transmission method according to the present application may be based on a network configuration. For example, if the base station allows to support the UE in using an unscheduled data transmission resource to send data to the base station, the UE enables this function, or if the base station supports using an unscheduled data transmission resource to receive data, and the UE also supports using an unscheduled data transmission resource to send data to the base station, the UE enables this function by default.

According to the data transmission method provided in this embodiment of the present application, the UE obtains the first information, where the first information includes at least one of the location information of the UE, the channel quality between the UE and the base station, the channel load between the UE and the base station, the size of the data to be sent by the UE, or the uplink service arrival sparseness degree of the base station; the UE determines whether the first information meets the preset condition; and if the first information does not meet the preset condition, the UE obtains the unscheduled uplink data transmission resource, and sends data to the base station by using the unscheduled uplink data transmission resource.

Based on the foregoing description of this embodiment, the UE can directly obtain the unscheduled uplink data transmission resource, instead of using a random access scheme to perform a large quantity of signaling interactions with the base station, so that fewer network resources are used and transmission efficiency is improved.

Embodiment 2

This embodiment of the present application provides a data transmission method.

S201. UE obtains at least one of a first preset threshold, a second preset threshold, a third preset threshold, a fourth preset threshold, a fifth preset threshold, a sixth preset threshold, or a seventh preset threshold.

It should be noted that, the first preset threshold is used to indicate a minimum value of channel quality between the UE and a base station, the second preset threshold is used to indicate a maximum value of channel load between the UE and the base station, the third preset threshold is used to indicate a maximum value of a size of data to be sent by the UE, the fourth preset threshold is used to indicate a maximum value of an uplink service arrival sparseness degree of the base station, the fifth preset threshold is used to indicate a minimum value of a remaining available power of the UE, the sixth preset threshold is used to indicate a maximum value of a path loss between the UE and the base station, and the seventh preset threshold is used to indicate a maximum value of a quantity of times that the UE fails to send a data packet to the base station by using an unscheduled uplink data transmission resource.

Figure 2:
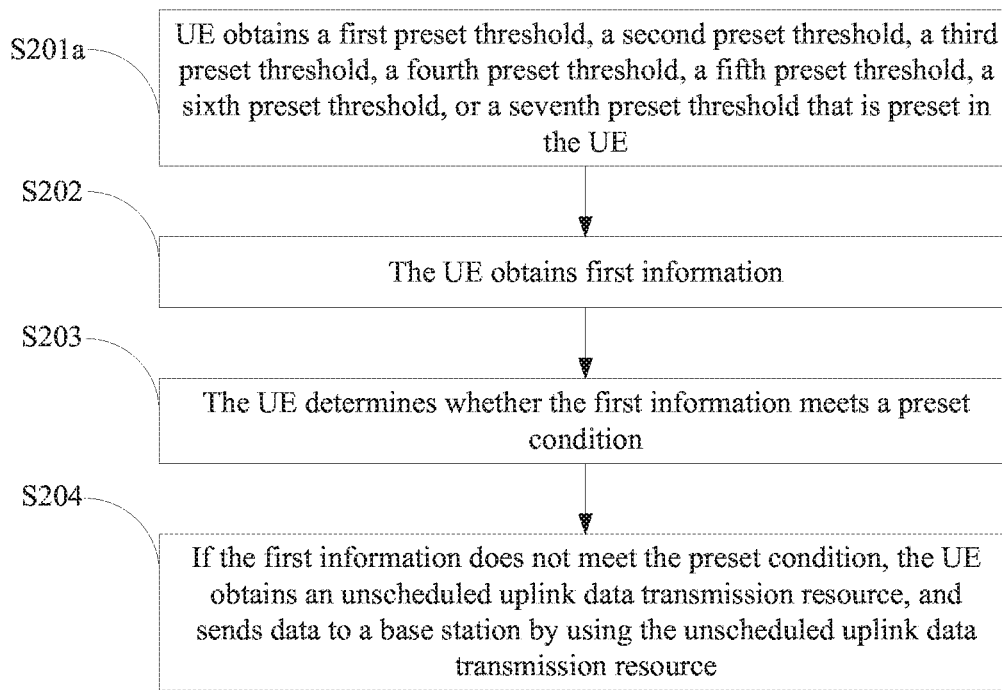
FIG. 2 is a schematic flowchart of a data transmission method according to Embodiment 2 of the present application.
Figure 3:
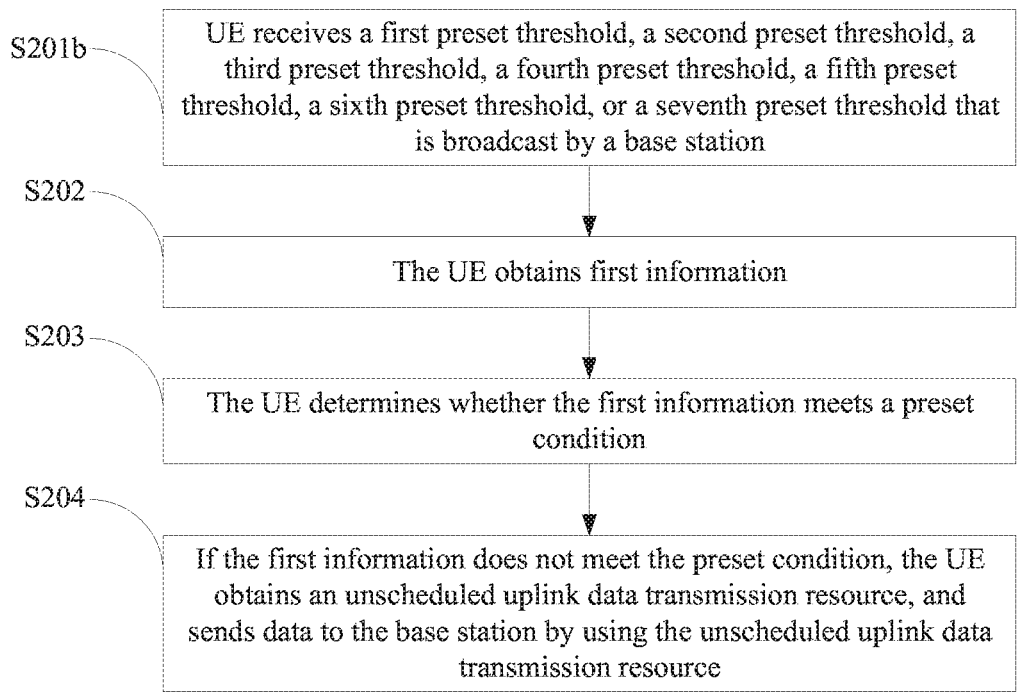
FIG. 3 is a schematic flowchart of another data transmission method according to Embodiment 2 of the present application.

For example, as shown in FIG. 2 or FIG. 3, the method for the UE to obtain at least one of the first preset threshold, the second preset threshold, the third preset threshold, the fourth preset threshold, the fifth preset threshold, the sixth preset threshold, or the seventh preset threshold may include step S201a or step S201b.

S201a. The UE obtains at least one of a first preset threshold, a second preset threshold, a third preset threshold, a fourth preset threshold, a fifth preset threshold, a sixth preset threshold, or a seventh preset threshold that is preset in the UE.

S201b. UE receives at least one of a first preset threshold, a second preset threshold, a third preset threshold, a fourth preset threshold, a fifth preset threshold, a sixth preset threshold, or a seventh preset threshold that is broadcast by a base station.

S202. The UE obtains first information.

The first information includes at least one of the location information of the UE, the channel quality between the UE and the base station, the channel load between the UE and the base station, the size of the data to be sent by the UE, or the uplink service arrival sparseness degree of the base station.

For example, if the first information is the location information of the UE, the UE obtains the first information in a manner that the UE determines the location information of the UE; if the first information is the channel quality between the UE and the base station, the channel load between the UE and the base station, or the uplink service arrival sparseness degree of the base station, the UE obtains the first information in a manner that the UE receives the first information sent by the base station; or if the first information is the size of the data to be sent by the UE, the UE obtains the first information in a manner that the UE directly reads the size of the data to be sent by the UE.

S203. The UE determines whether the first information meets a preset condition.

For example, if the first information includes the location information of the UE, the UE determines whether the first information meets a preset condition by determining whether a location of the UE is on a coverage edge of the base station.

In another embodiment of the present application, if the first information includes the channel quality between the UE and the base station, the UE determines whether the first information meets a preset condition by determining whether the channel quality between the UE and the base station is less than the first preset threshold. If the channel quality between the UE and the base station is less than the first preset threshold, the UE determines that the first information meets the preset condition; or if the channel quality between the UE and the base station is not less than the first preset threshold, the UE determines that the first information does not meet the preset condition.

In another embodiment of the present application, if the first information includes the channel load between the UE and the base station, the UE determines whether the first information meets a preset condition by determining whether the channel load between the UE and the base station is greater than the second preset threshold. If the channel load between the UE and the base station is greater than the second preset threshold, the UE determines that the first information meets the preset condition; or if the channel load between the UE and the base station is not greater than the second preset threshold, the UE determines that the first information does not meet the preset condition.

In another embodiment of the present application, if the first information includes the size of the data to be sent by the UE, the UE determines whether the first information meets a preset condition by determining whether the size of the data to be sent by the UE is greater than the third preset threshold. If the size of the data to be sent by the UE is greater than the third preset threshold, the UE determines that the first information meets the preset condition; or if the size of the data to be sent by the UE is not greater than the third preset threshold, the UE determines that the first information does not meet the preset condition.

In another embodiment of the present application, if the first information includes the uplink service arrival sparseness degree of the base station, the UE determines whether the first information meets a preset condition by determining whether the uplink service arrival sparseness degree of the base station is greater than the fourth preset threshold. If the uplink service arrival sparseness degree of the base station is greater than the fourth preset threshold, the UE determines that the first information meets the preset condition; or if the uplink service arrival sparseness degree of the base station is not greater than the fourth preset threshold, the UE determines that the first information does not meet the preset condition. The uplink service arrival sparseness degree of the base station is a traffic amount of data transmitted between the base station and the UE in a unit time period.

For example, a method for the UE to determine whether the location of the UE is on the coverage edge of the base station may include: the UE determines whether the remaining available power of the UE is less than the fifth preset threshold; or the UE determines whether the path loss between the UE and the base station is greater than the sixth preset threshold. If the remaining available power of the UE is less than the fifth preset threshold, the UE determines that the location of the UE is on the coverage edge of the base station; or if the remaining available power of the UE is not less than the fifth preset threshold, the UE determines that the location of the UE is not on the coverage edge of the base station. If the path loss between the UE and the base station is greater than the sixth preset threshold, the UE determines that the location of the UE is on the coverage edge of the base station; or if the path loss between the UE and the base station is not greater than the sixth preset threshold, the UE determines that the location of the UE is not on the coverage edge of the base station.

In another embodiment of the present application, the first information further includes the quantity of times that the UE fails to send a data packet to the base station by using the unscheduled uplink data transmission resource; and that the UE determines whether the first information meets a preset condition further includes: the UE determines whether the quantity of times that the UE fails to send a data packet to the base station by using the unscheduled uplink data transmission resource is greater than the seventh preset threshold. If the quantity of times that the UE fails to send a data packet to the base station by using the unscheduled uplink data transmission resource is greater than the seventh preset threshold, the UE determines that the first information meets the preset condition; or if the quantity of times that the UE fails to send a data packet to the base station by using the unscheduled uplink data transmission resource is less than or equal to the seventh preset threshold, the UE determines that the first information does not meet the preset condition. The seventh preset threshold is used to indicate the maximum value of the quantity of times that the UE fails to send a data packet to the base station by using the unscheduled uplink data transmission resource. In addition, the data packet sent to the base station by the UE by using the unscheduled uplink data transmission resource in this embodiment may be one data packet or a plurality of data packets that are sent in a period of time. This is not specifically limited in the present application.

It should be noted that, if the first information includes only one of the location information of the UE, the channel quality between the UE and the base station, the channel load between the UE and the base station, the size of the data to be sent by the UE, the uplink service arrival sparseness degree of the base station, or a quantity of times that the UE fails to send, by using the unscheduled uplink data transmission resource, one data packet to the base station or a plurality of data packets in a period of time to the base station, when determining whether the first information meets the preset condition, the UE needs to determine only whether the one piece of information meets a corresponding preset condition. If the first information includes at least two of the location information of the UE, the channel quality between the UE and the base station, the channel load between the UE and the base station, the size of the data to be sent by the UE, or the uplink service arrival sparseness degree of the base station, when determining whether the first information meets the preset condition, the UE needs to determine whether the at least two pieces of information included meet corresponding preset conditions. The first information is considered to meet the preset condition provided that one of the at least two pieces of information meets a corresponding preset condition.

S204. If the first information does not meet the preset condition, the UE obtains an unscheduled uplink data transmission resource, and sends data to the base station by using the unscheduled uplink data transmission resource.

If the first information does not meet the preset condition, the UE obtains the unscheduled uplink data transmission resource, and sends data to the base station by using the unscheduled uplink data transmission resource. Different from an existing random access scheme, this manner does not need a large quantity of signaling interactions with the base station, so that fewer network resources are used and transmission efficiency is improved.

For example, when an unscheduled uplink data transmission resource is broadcast to the UE by the base station, after determining that the first information does not meet the preset condition, the UE selects one unscheduled uplink data transmission resource from unscheduled uplink data transmission resources that are received, and sends data to the base station by using the unscheduled uplink data transmission resource; or when an unscheduled uplink data transmission resource is sent to the UE by the base station by using dedicated signaling, after determining that the first information does not meet the preset condition, the UE sends data to the base station by using the unscheduled uplink data transmission resource. If the unscheduled uplink data transmission resource is sent to the UE by the base station by using the dedicated signaling, before determining that the first information does not meet the preset condition, the UE needs to obtain the unscheduled uplink data transmission resource.

It should be noted that, if the first information meets the preset condition, the UE initiates a random access request, a scheduling request, or a buffer status report, to request an uplink scheduled resource from the base station, and sends data to the base station by using the uplink scheduled resource.

For example, a process in which the UE initiates the random access request, the scheduling request, or the buffer status report, to request the uplink scheduled resource from the base station, and sends data to the base station by using the uplink scheduled resource is the same as an existing random access process, and details are not described herein again.

Figure 4:
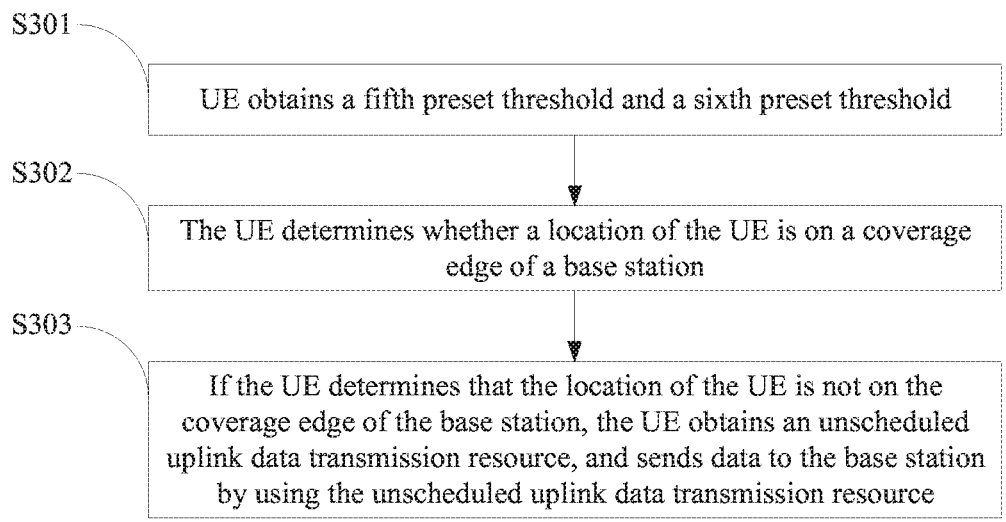
FIG. 4 is schematic flowchart 1 of a data transmission method in which first information is location information of UE according to Embodiment 2 of the present application.

For example, if the first information is the location information of the UE, the data transmission method provided in this embodiment of the present application is shown in FIG. 4.

S301. The UE obtains the fifth preset threshold and the sixth preset threshold.

For example, the fifth preset threshold and the sixth preset threshold may be preset in the UE, or may be broadcast by the base station and received by the UE.

S302. The UE determines whether the location of the UE is on the coverage edge of the base station.

Figure 5:
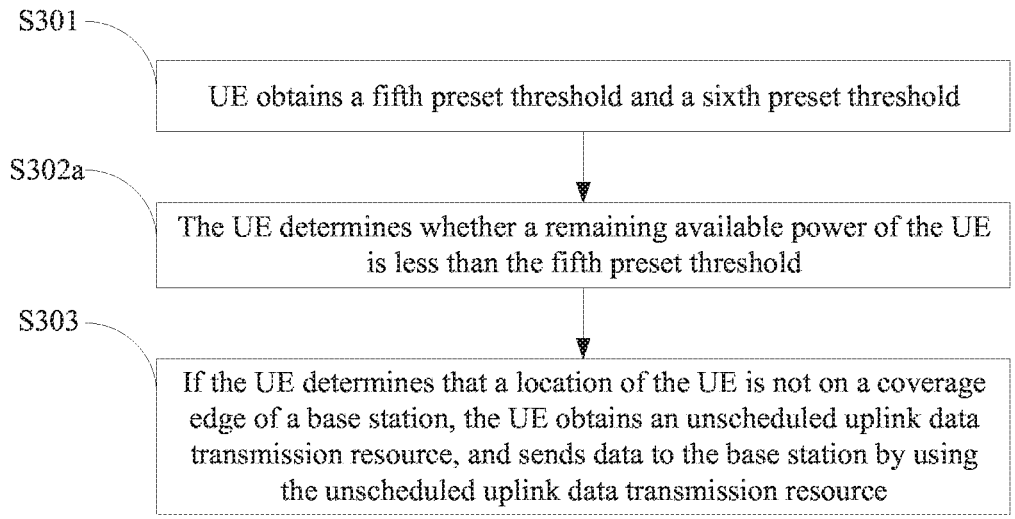
FIG. 5 is schematic flowchart 2 of a data transmission method in which first information is location information of UE according to Embodiment 2 of the present application.
Figure 6:
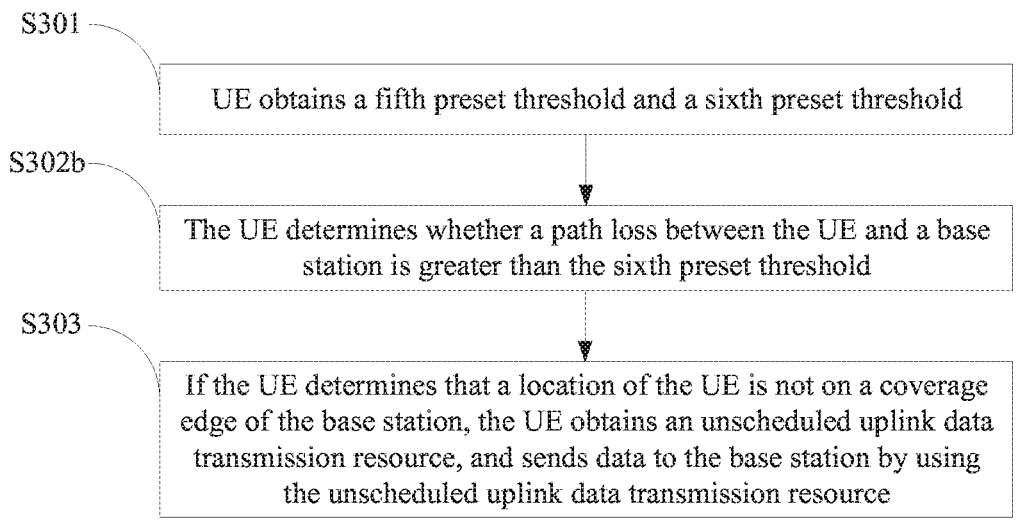
FIG. 6 is schematic flowchart 3 of a data transmission method in which first information is location information of UE according to Embodiment 2 of the present application.

For example, as shown in FIG. 5 or FIG. 6, the method for the UE to determine whether the location of the UE is on the coverage edge of the base station includes S302a or S302b.

S302a. The UE determines whether the remaining available power of the UE is less than the fifth preset threshold.

If the remaining available power of the UE is less than the fifth preset threshold, it indicates that the location of the UE is on the coverage edge of the base station; or if the remaining available power of the UE is not less than the fifth preset threshold, it indicates that the location of the UE is not on the coverage edge of the base station.

S302b. The UE determines whether the path loss between the UE and a base station is greater than the sixth preset threshold.

If the path loss between the UE and the base station is greater than the sixth preset threshold, it indicates that the location of the UE is on the coverage edge of the base station; or if the path loss between the UE and the base station is not greater than the sixth preset threshold, the UE determines that the location of the UE is not on the coverage edge of the base station.

It should be noted that, the method for the UE to determine whether the location of the UE is on the coverage edge of a base station is not limited to the foregoing two methods. Any method for determining whether the location of the UE is on the coverage edge of the base station (for example, a signal-to-noise ratio between the UE and the base station is used to determine whether the location of the UE is on the coverage edge of the base station) shall fall within the protection scope of the present application, and details are not described herein again.

S303. If the UE determines that the location of the UE is not on the coverage edge of the base station, the UE obtains the unscheduled uplink data transmission resource, and sends data to the base station by using the unscheduled uplink data transmission resource.

If the UE determines that the location of the UE is on the coverage edge of the base station, the UE initiates the random access request, the scheduling request, or the buffer status report, to request the uplink scheduled resource from the base station, and sends data to the base station by using the uplink scheduled resource.

Figure 7:
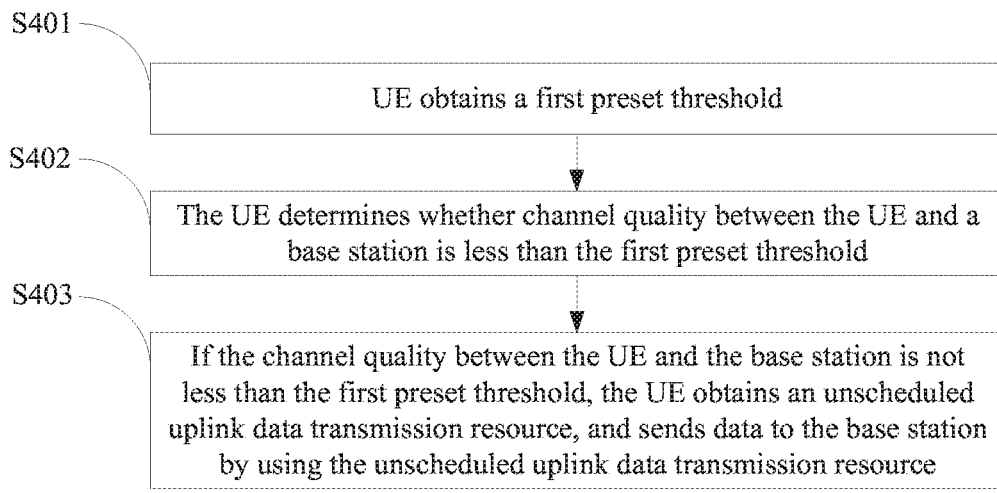
FIG. 7 is a schematic flowchart of a data transmission method in which first information is channel quality between UE and a base station according to Embodiment 2 of the present application.

For example, if the first information is the channel quality between the UE and the base station, the data transmission method provided in this embodiment of the present application is shown in FIG. 7.

S401. The UE obtains the first preset threshold.

For example, the first preset threshold may be preset in the UE, or may be broadcast by the base station and received by the UE.

S402. The UE determines whether the channel quality between the UE and the base station is less than the first preset threshold.

It should be noted that, the method for the UE to determine whether the channel quality between the UE and the base station is less than the first preset threshold may include: the UE determines whether a signal-to-noise ratio, a channel quality indicator (CQI), or a channel status indicator (CSI) between the UE and the base station is less than the first preset threshold. The CQI is used to indicate channel quality and represent current channel quality, and is in a value range from 0 to 31 (including 0 and 31). The CSI is used to indicate an attenuation factor of a signal on each transmission path, that is, a value of each element in a channel gain matrix H, such as signal scattering, environment fading (including multipath fading or shadowing fading), or power decay of distance, or other information.

S403. If the channel quality between the UE and the base station is not less than the first preset threshold, the UE obtains an unscheduled uplink data transmission resource, and sends data to the base station by using the unscheduled uplink data transmission resource.

If the channel quality between the UE and the base station is less than the first preset threshold, the UE initiates the random access request, the scheduling request, or the buffer status report, to request the uplink scheduled resource from the base station, and sends data to the base station by using the uplink scheduled resource.

Figure 8:
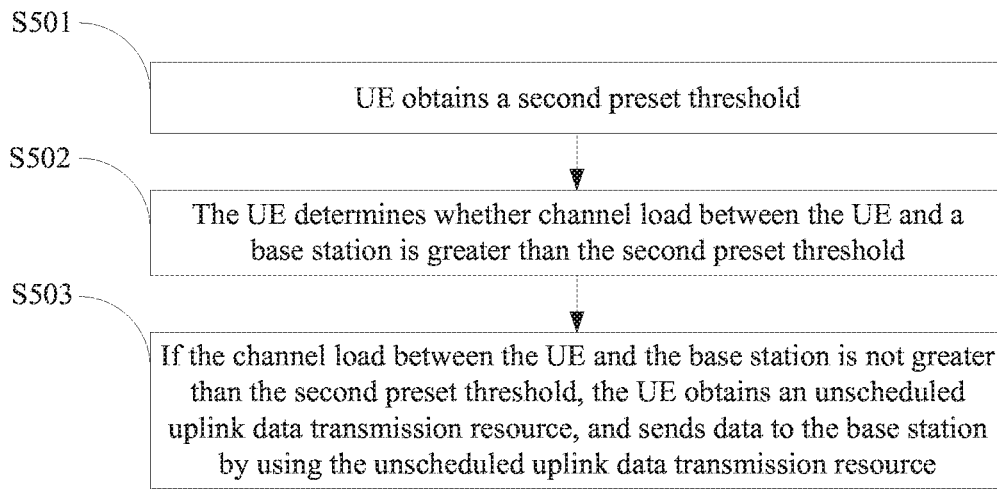
FIG. 8 is a schematic flowchart of a data transmission method in which first information is channel load between UE and a base station according to Embodiment 2 of the present application.

For example, if the first information is the channel load between the UE and the base station, the data transmission method provided in this embodiment of the present application is shown in FIG. 8.

S501. The UE obtains the second preset threshold.

For example, the second preset threshold may be preset in the UE, or may be broadcast by the base station and received by the UE.

S502. The UE determines whether the channel load between the UE and the base station is greater than the second preset threshold.

S503. If the channel load between the UE and the base station is not greater than the second preset threshold, the UE obtains the unscheduled uplink data transmission resource, and sends data to the base station by using the unscheduled uplink data transmission resource.

If the channel load between the UE and the base station is greater than the second preset threshold, the UE initiates the random access request, the scheduling request, or the buffer status report, to request the uplink scheduled resource from the base station, and sends data to the base station by using the uplink scheduled resource.

Figure 9:
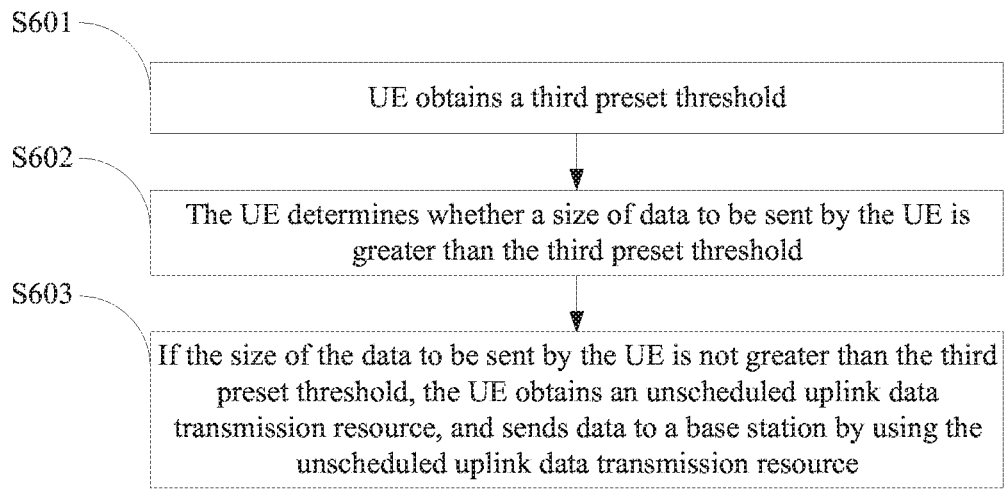
FIG. 9 is a schematic flowchart of a data transmission method in which first information is a size of data to be sent by UE according to Embodiment 2 of the present application.

For example, if the first information is the size of data to be sent by the UE, the data transmission method provided in this embodiment of the present application is shown in FIG. 9.

S601. The UE obtains the third preset threshold.

For example, the third preset threshold may be preset in the UE, or may be broadcast by the base station and received by the UE.

S602. The UE determines whether the size of data to be sent by the UE is greater than the third preset threshold.

S603. If the size of the data to be sent by the UE is not greater than the third preset threshold, the UE obtains the unscheduled uplink data transmission resource, and sends data to the base station by using the unscheduled uplink data transmission resource.

If the size of the data to be sent by the UE is greater than the third preset threshold, the UE initiates the random access request to request the uplink scheduled resource from the base station, and sends data to the base station by using the uplink scheduled resource.

Figure 10:
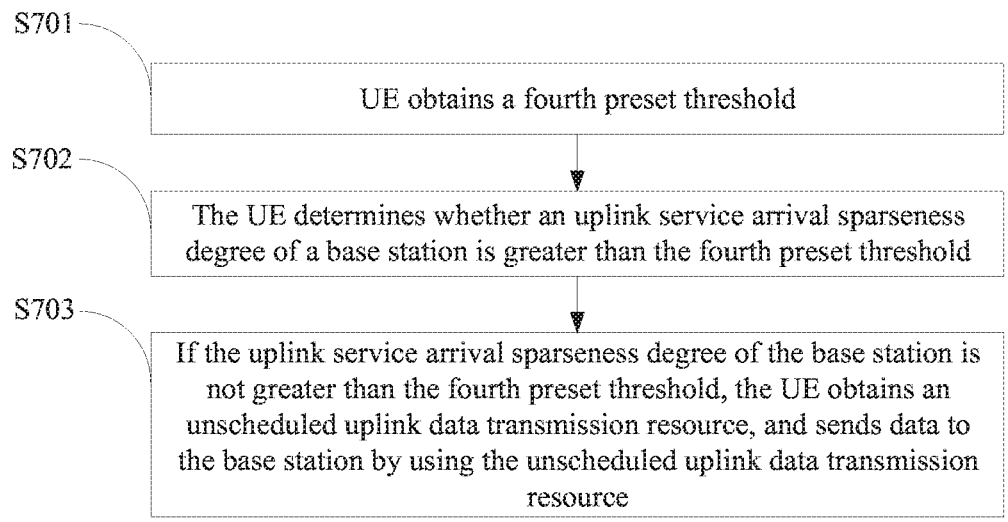
FIG. 10 is a schematic flowchart of a data transmission method in which first information is an uplink service arrival sparseness degree of a base station according to Embodiment 2 of the present application.

For example, if the first information is the uplink service arrival sparseness degree of the base station, the data transmission method provided in this embodiment of the present application is shown in FIG. 10.

S701. The UE obtains the fourth preset threshold.

For example, the fourth preset threshold may be preset in the UE, or may be broadcast by the base station and received by the UE.

S702. The UE determines whether the uplink service arrival sparseness degree of the base station is greater than the fourth preset threshold.

S703. If the uplink service arrival sparseness degree of the base station is not greater than the fourth preset threshold, the UE obtains the unscheduled uplink data transmission resource, and sends data to the base station by using the unscheduled uplink data transmission resource.

If the uplink service arrival sparseness degree of the base station is greater than the fourth preset threshold, the UE initiates the random access request, the scheduling request, or the buffer status report, to request the uplink scheduled resource from the base station, and sends data to the base station by using the uplink scheduled resource.

Figure 11:
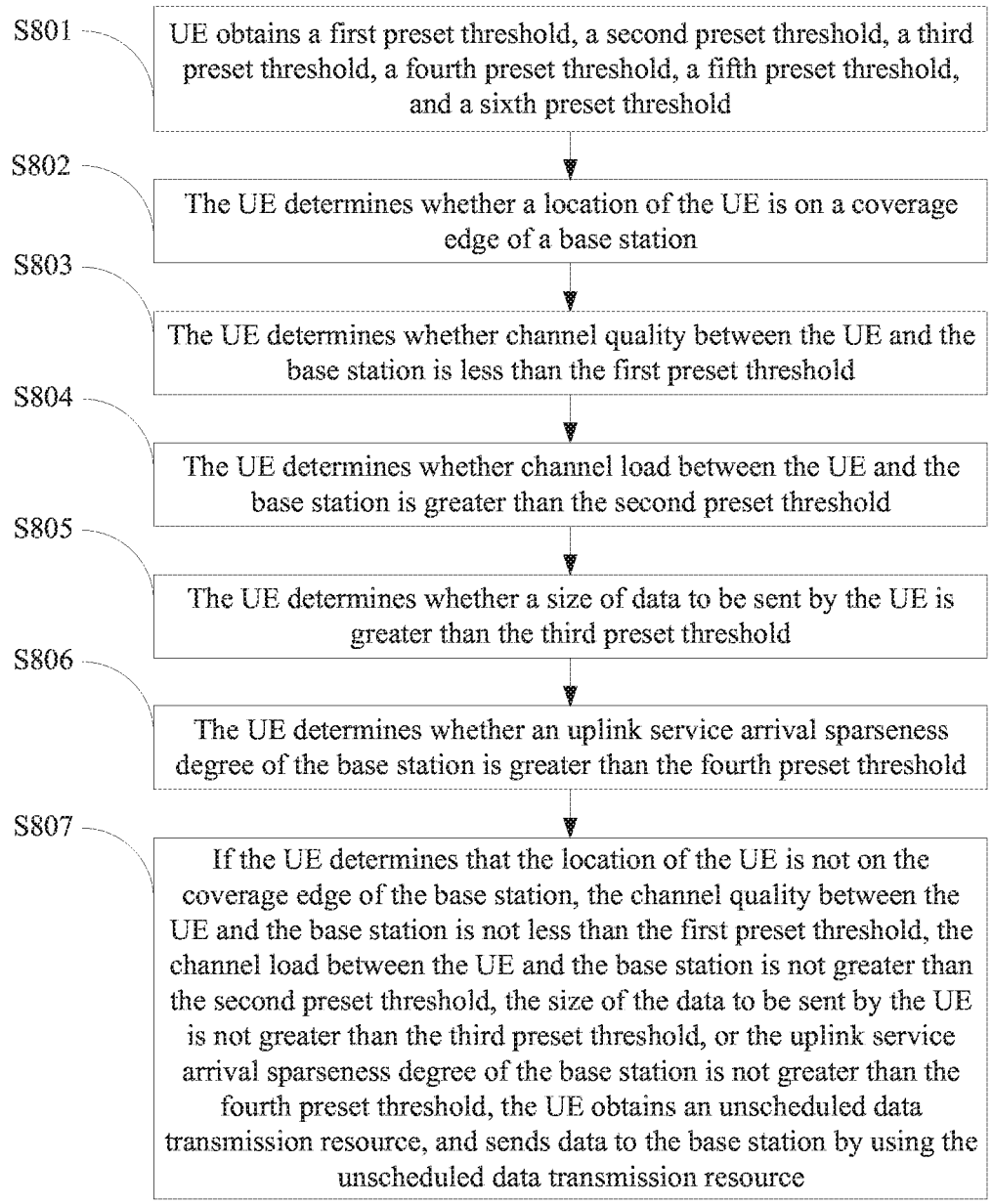
FIG. 11 is a schematic flowchart of a data transmission method in which first information includes location information of UE, channel quality between the UE and a base station, channel load between the UE and the base station, a size of data to be sent by the UE, or an uplink service arrival sparseness degree of the base station according to Embodiment 2 of the present application.

For example, if the first information includes at least one of the location information of the UE, the channel quality between the UE and the base station, the channel load between the UE and the base station, the size of the data to be sent by the UE, or the uplink service arrival sparseness degree of the base station, the data transmission method provided in this embodiment of the present application is shown in FIG. 11.

S801. The UE obtains the first preset threshold, the second preset threshold, the third preset threshold, the fourth preset threshold, the fifth preset threshold, and the sixth preset threshold.

For example, the first preset threshold, the second preset threshold, the third preset threshold, the fourth preset threshold, the fifth preset threshold, and the sixth preset threshold may be preset in the UE, or may be broadcast by the base station and received by the UE.

S802. The UE determines whether the location of the UE is on the coverage edge of the base station.

For example, the method for the UE to determine whether the location of the UE is on the coverage edge of the base station may include: the UE determines whether the remaining available power of the UE is less than the fifth preset threshold. If the remaining available power of the UE is less than the fifth preset threshold, it indicates that the location of the UE is on the coverage edge of the base station; or if the remaining available power of the UE is not less than the fifth preset threshold, it indicates that the location of the UE is not on the coverage edge of the base station.

The method for the UE to determine whether the location of the UE is on the coverage edge of the base station may further include: the UE determines whether the path loss between the UE and the base station is greater than the sixth preset threshold. If the path loss between the UE and the base station is greater than the sixth preset threshold, it indicates that the location of the UE is on the coverage edge of the base station; or if the path loss between the UE and the base station is not greater than the sixth preset threshold, the UE determines that the location of the UE is not on the coverage edge of the base station.

S803. The UE determines whether channel quality between the UE and the base station is less than the first preset threshold.

It should be noted that, the method for the UE to determine whether the channel quality between the UE and the base station is less than the first preset threshold may include: the UE determines a signal-to-noise ratio or a channel quality indicator (CQI) between the UE and the base station. The CQI is used to indicate channel quality and represent current channel quality, and is in a value range from 0 to 31.

S804. The UE determines whether the channel load between the UE and the base station is greater than the second preset threshold.

S805. The UE determines whether the size of the data to be sent by the UE is greater than the third preset threshold.

S806. The UE determines whether the uplink service arrival sparseness degree of the base station is greater than the fourth preset threshold.

It should be additionally noted that, there is no execution sequence relationship among steps S802 to S806.

S807. If the UE determines that the location of the UE is not on the coverage edge of the base station, the channel quality between the UE and the base station is not less than the first preset threshold, the channel load between the UE and the base station is not greater than the second preset threshold, the size of the data to be sent by the UE is not greater than the third preset threshold, or the uplink service arrival sparseness degree of the base station is not greater than the fourth preset threshold, the UE obtains the unscheduled data transmission resource, and sends data to the base station by using the unscheduled data transmission resource.

If the UE determines that the location of the UE is on the coverage edge of the base station, the channel quality between the UE and the base station is less than the first preset threshold, the channel load between the UE and the base station is greater than the second preset threshold, the size of the data to be sent by the UE is greater than the third preset threshold, or the uplink service arrival sparseness degree of the base station is greater than the fourth preset threshold, the UE initiates the random access request, the scheduling request, or the buffer status report, to request the uplink scheduled resource from the base station, and sends data to the base station by using the uplink scheduled resource.

It should be noted that, specific information included in the first information may be configured according to user needs and is not limited by the present application.

It should be additionally noted that, based on the description in the foregoing embodiment, the UE may further determine, with reference to a random number generated by the UE, whether the first information meets the preset condition. For example, the UE determines that the location of the UE is not on the coverage edge of the base station, the channel quality between the UE and the base station is not less than the first preset threshold, or the size of the data to be sent by the UE is not greater than the third preset threshold, and the random number generated by the UE is greater than a random number threshold; then, the UE uses an unscheduled uplink data transmission mode. For example, the UE determines that the channel load between the UE and the base station is not greater than the second preset threshold, and the random number generated by the UE is greater than the random number threshold. For example, the UE determines that the uplink service arrival sparseness degree of the base station is not greater than the fourth preset threshold, and the random number generated by the UE is greater than the random number threshold. For example, one or more of the foregoing conditions are met, and the random number generated by the UE is greater than the random number threshold. The random number threshold may be configured for the UE by the base station or agreed on in a communications protocol by the base station and the UE. In this way, a manner of sending data to the base station by the UE can be determined more accurately.

According to the data transmission method provided in this embodiment of the present application, the UE obtains the first information, where the first information includes at least one of the location information of the UE, the channel quality between the UE and the base station, the channel load between the UE and the base station, the size of the data to be sent by the UE, or the uplink service arrival sparseness degree of the base station; the UE determines whether the first information meets the preset condition; and if the first information does not meet the preset condition, the UE obtains the unscheduled uplink data transmission resource, and sends data to the base station by using the unscheduled uplink data transmission resource.

Based on the foregoing description of this embodiment, the UE can directly obtain the unscheduled uplink data transmission resource, instead of using a random access scheme to perform a large quantity of signaling interactions with the base station, so that fewer network resources are used and transmission efficiency is improved.

Embodiment 3

Figure 12:
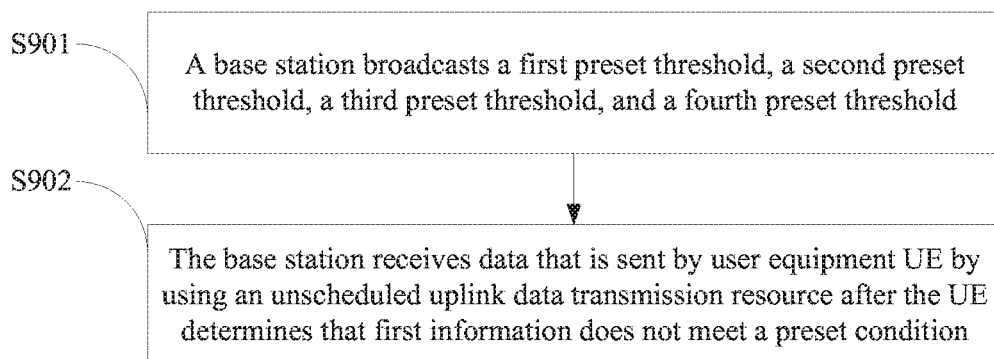
FIG. 12 is a schematic flowchart of a data transmission method according to Embodiment 3 of the present application.

The present application provides a data transmission method, as shown in FIG. 12.

S901. A base station broadcasts a first preset threshold, a second preset threshold, a third preset threshold, and a fourth preset threshold.

Further, the base station may further broadcast a fifth preset threshold and a sixth preset threshold.

The first preset threshold is used to indicate a minimum value of channel quality between UE and the base station, the second preset threshold is used to indicate a maximum value of channel load between the UE and the base station, the third preset threshold is used to indicate a maximum value of a size of data to be sent by the UE, the fourth preset threshold is used to indicate a maximum value of an uplink service arrival sparseness degree of the base station, the fifth preset threshold is used to indicate a minimum value of a remaining available power of the UE, and the sixth preset threshold is used to indicate a maximum value of a path loss between the UE and the base station.

It should be noted that step S901 is an optional step. If the first preset threshold, the second preset threshold, the third preset threshold, and the fourth preset threshold are preconfigured in the UE, step S901 does not need to be executed; if the first preset threshold, the second preset threshold, the third preset threshold, and the fourth preset threshold are not preconfigured in the UE, S901 is executed.

S902. The base station receives data that is sent by user equipment (UE) by using an unscheduled uplink data transmission resource after the UE determines that first information does not meet a preset condition.

The first information includes at least one of location information of the UE, the channel quality between the UE and the base station, the channel load between the UE and the base station, the size of the data to be sent by the UE, or the uplink service arrival sparseness degree of the base station.

According to the data transmission method provided in this embodiment of the present application, the base station receives the data that is sent by the user equipment (UE) by using the unscheduled uplink data transmission resource.

Based on the foregoing description of this embodiment, the UE can directly obtain the unscheduled uplink data transmission resource, instead of using a random access scheme to perform a large quantity of signaling interactions with the base station, so that fewer network resources are used and transmission efficiency is improved.

Embodiment 4

Figure 13:
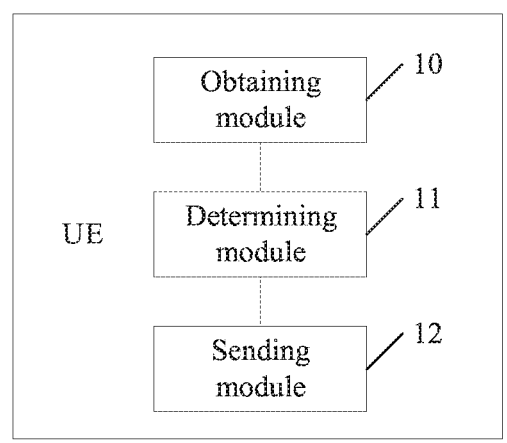
FIG. 13 is a schematic structural diagram of UE according to Embodiment 4 of the present application.

This embodiment of the present application provides UE. As shown in FIG. 13, the UE includes an obtaining module 10 configured to obtain first information, where the first information includes at least one of location information of the UE, channel quality between the UE and a base station, channel load between the UE and the base station, a size of data to be sent by the UE, or an uplink service arrival sparseness degree of the base station; a determining module 11 configured to determine whether the first information meets a preset condition; and a sending module 12 configured to obtain an unscheduled uplink data transmission resource if the first information does not meet the preset condition, and send data to the base station by using the unscheduled uplink data transmission resource.

If the first information meets the preset condition, the sending module 12 is further configured to initiate a random access request, a scheduling request, or a buffer status report, to request an uplink scheduled resource from the base station, and send data to the base station by using the uplink scheduled resource.

Further, the determining module 11 is configured to: if the first information includes at least the location information of the UE, determine whether a location of the UE is on a coverage edge of the base station; if the first information includes the channel quality between the UE and the base station, determine whether the channel quality between the UE and the base station is less than a first preset threshold; if the first information includes the channel load between the UE and the base station, determine whether the channel load between the UE and the base station is greater than a second preset threshold; if the first information includes the size of the data to be sent by the UE, determine whether the size of the data to be sent by the UE is greater than a third preset threshold; or if the first information includes the uplink service arrival sparseness degree of the base station, determine whether the uplink service arrival sparseness degree of the base station is greater than a fourth preset threshold.

Further, the determining module 11 is configured to determine whether a remaining available power of the UE is less than a fifth preset threshold; and determine whether a path loss between the UE and the base station is greater than a sixth preset threshold.

Further, the first information further includes a quantity of times that the UE fails to send a data packet to the base station by using the unscheduled uplink data transmission resource; and the determining module 11 is further configured to determine whether the quantity of times that the UE fails to send a data packet to the base station by using the unscheduled uplink data transmission resource is greater than a seventh preset threshold.

Further, the obtaining module 10 is further configured to obtain at least one of the first preset threshold, the second preset threshold, the third preset threshold, the fourth preset threshold, or the seventh preset threshold before the obtaining module 10 obtains the first information.

Further, the obtaining module 10 is further configured to obtain the fifth preset threshold and the sixth preset threshold.

Further, the obtaining module 10 is configured to obtain at least one of the first preset threshold, the second preset threshold, the third preset threshold, the fourth preset threshold, the fifth preset threshold, the sixth preset threshold, or the seventh preset threshold that is preset in the UE.

Figure 14:
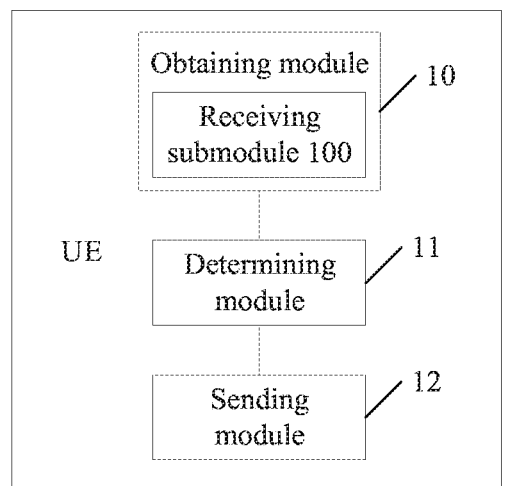
FIG. 14 is a schematic structural diagram of another UE according to Embodiment 4 of the present application.

As shown in FIG. 14, the obtaining module 10 further includes a receiving submodule 100 configured to receive at least one of the first preset threshold, the second preset threshold, the third preset threshold, the fourth preset threshold, the fifth preset threshold, the sixth preset threshold, or the seventh preset threshold that is broadcast by the base station.

This embodiment of the present application provides the UE including the obtaining module configured to obtain the first information, where the first information includes at least one of the location information of the UE, the channel quality between the UE and the base station, the channel load between the UE and the base station, the size of the data to be sent by the UE, or the uplink service arrival sparseness degree of the base station; the determining module configured to determine whether the first information meets the preset condition; and the sending module configured to obtain the unscheduled uplink data transmission resource if the first information does not meet the preset condition, and send data to the base station by using the unscheduled uplink data transmission resource.

Based on the foregoing description of this embodiment, the UE can directly obtain the unscheduled uplink data transmission resource, instead of using a random access scheme to perform a large quantity of signaling interactions with the base station, so that fewer network resources are used and transmission efficiency is improved.

Embodiment 5

Figure 15:
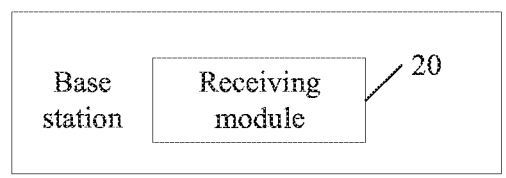
FIG. 15 is a schematic structural diagram of a base station according to Embodiment 5 of the present application.

This embodiment of the present application provides a base station. As shown in FIG. 15, the base station includes a receiving module 20 configured to receive data that is sent by user equipment (UE) by using an unscheduled uplink data transmission resource after the UE determines that first information does not meet a preset condition, where the first information includes at least one of location information of the UE, channel quality between the UE and the base station, channel load between the UE and the base station, a size of data to be sent by the UE, or an uplink service arrival sparseness degree of the base station.

Further, the first information further includes a quantity of times that the UE fails to send a data packet to the base station by using the unscheduled uplink data transmission resource.

Figure 16:
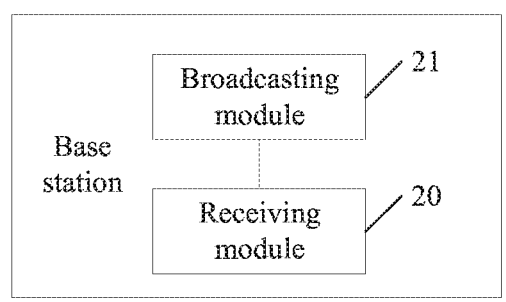
FIG. 16 is a schematic structural diagram of another base station according to Embodiment 5 of the present application.

Further, as shown in FIG. 16, the base station further includes a broadcasting module 21 configured to broadcast at least one of a first preset threshold, a second preset threshold, a third preset threshold, a fourth preset threshold, or a seventh preset threshold before the receiving module 20 receives the data that is sent by the user equipment (UE) by using the unscheduled uplink data transmission resource after the UE determines that the first information does not meet the preset condition, where the first preset threshold is used to indicate a minimum value of the channel quality between the UE and the base station, the second preset threshold is used to indicate a maximum value of the channel load between the UE and the base station, the third preset threshold is used to indicate a maximum value of the size of the data to be sent by the UE, the fourth preset threshold is used to indicate a maximum value of the uplink service arrival sparseness degree of the base station, and the seventh preset threshold is used to indicate a maximum value of the quantity of times that the UE fails to send a data packet to the base station by using the unscheduled uplink data transmission resource.

Further, the broadcasting module 21 is further configured to broadcast a fifth preset threshold and a sixth preset threshold. The fifth preset threshold is used to indicate a minimum value of a remaining available power of the UE, and the sixth preset threshold is used to indicate a maximum value of a path loss between the UE and the base station.

This embodiment of the present application provides the base station including the receiving module configured to receive the data that is sent by the user equipment (UE) by using the unscheduled uplink data transmission resource after the UE determines that the first information does not meet the preset condition, where the first information includes at least one of the location information of the UE, the channel quality between the UE and the base station, the channel load between the UE and the base station, the size of the data to be sent by the UE, or the uplink service arrival sparseness degree of the base station.

Based on the foregoing description of this embodiment, the UE can directly obtain the unscheduled uplink data transmission resource, instead of using a random access scheme to perform a large quantity of signaling interactions with the base station, so that fewer network resources are used and transmission efficiency is improved.

Embodiment 6

Figure 17:
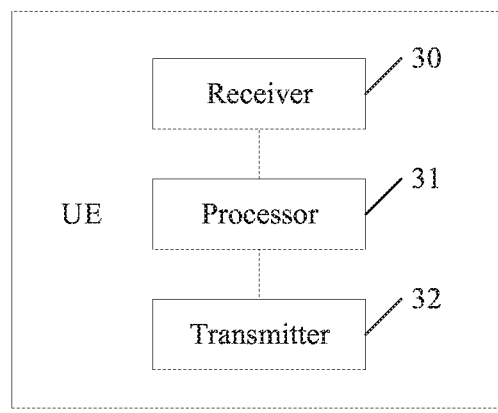
FIG. 17 is a schematic structural diagram of UE according to Embodiment 6 of the present application.

This embodiment of the present application provides UE. As shown in FIG. 17, the UE includes a receiver 30 configured to obtain first information, where the first information includes at least one of location information of the UE, channel quality between the UE and a base station, channel load between the UE and the base station, a size of data to be sent by the UE, or an uplink service arrival sparseness degree of the base station; a processor 31 configured to determine whether the first information meets a preset condition; and a transmitter 32 configured to obtain an unscheduled uplink data transmission resource if the first information does not meet the preset condition, and send data to the base station by using the unscheduled uplink data transmission resource.

If the first information meets the preset condition, the transmitter 32 is further configured to initiate a random access request, a scheduling request, or a buffer status report, to request an uplink scheduled resource from the base station, and send data to the base station by using the uplink scheduled resource.

Further, the processor 31 is configured to: if the first information includes the location information of the UE, determine whether a location of the UE is on a coverage edge of the base station; if the first information includes the channel quality between the UE and the base station, determine whether the channel quality between the UE and the base station is less than a first preset threshold; if the first information includes the channel load between the UE and the base station, determine whether the channel load between the UE and the base station is greater than a second preset threshold; if the first information includes the size of the data to be sent by the UE, determine whether the size of the data to be sent by the UE is greater than a third preset threshold; or if the first information includes the uplink service arrival sparseness degree of the base station, determine whether the uplink service arrival sparseness degree of the base station is greater than a fourth preset threshold.

Further, the processor 31 is configured to determine whether a remaining available power of the UE is less than a fifth preset threshold; and determine whether a path loss between the UE and the base station is greater than a sixth preset threshold.

Further, the first information further includes a quantity of times that the UE fails to send a data packet to the base station by using the unscheduled uplink data transmission resource; and the processor 31 is further configured to determine whether the quantity of times that the UE fails to send a data packet to the base station by using the unscheduled uplink data transmission resource is greater than a seventh preset threshold.

Further, the receiver 30 is further configured to obtain at least one of the first preset threshold, the second preset threshold, the third preset threshold, the fourth preset threshold, or the seventh preset threshold before the receiver 30 obtains the first information.

Further, the receiver 30 is further configured to obtain the fifth preset threshold and the sixth preset threshold.

Further, the receiver 30 is configured to, before the receiver 30 obtains the first information, obtain the first preset threshold, the second preset threshold, the third preset threshold, or the fourth preset threshold that is preset in the UE; or receive at least one of the first preset threshold, the second preset threshold, the third preset threshold, the fourth preset threshold, or the seventh preset threshold that is broadcast by the base station.

This embodiment of the present application provides the UE including the receiver configured to obtain the first information, where the first information includes at least one of the location information of the UE, the channel quality between the UE and the base station, the channel load between the UE and the base station, the size of the data to be sent by the UE, or the uplink service arrival sparseness degree of the base station; the processor configured to determine whether the first information meets the preset condition; and the transmitter configured to obtain the unscheduled uplink data transmission resource if the first information does not meet the preset condition, and send data to the base station by using the unscheduled uplink data transmission resource.

Based on the foregoing description of this embodiment, the UE can directly obtain the unscheduled uplink data transmission resource, instead of using a random access scheme to perform a large quantity of signaling interactions with the base station, so that fewer network resources are used and transmission efficiency is improved.

Embodiment 7

Figure 18:
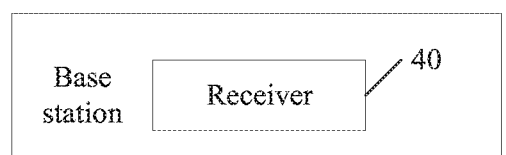
FIG. 18 is a schematic structural diagram of a base station according to Embodiment 7 of the present application.

This embodiment of the present application provides a base station. As shown in FIG. 18, the base station includes a receiver 40 configured to receive data that is sent by user equipment (UE) by using an unscheduled uplink data transmission resource after the UE determines that first information does not meet a preset condition, where the first information includes at least one of location information of the UE, channel quality between the UE and the base station, channel load between the UE and the base station, a size of data to be sent by the UE, or an uplink service arrival sparseness degree of the base station.

Further, the first information further includes a quantity of times that the UE fails to send a data packet to the base station by using the unscheduled uplink data transmission resource.

Figure 19:
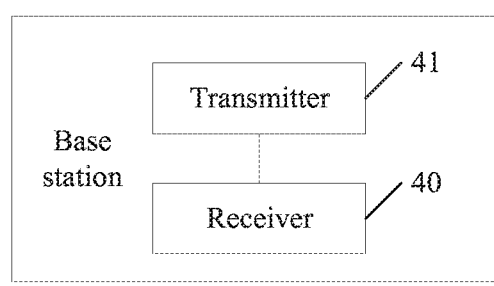
FIG. 19 is a schematic structural diagram of another base station according to Embodiment 7 of the present application.

Further, as shown in FIG. 19, the base station further includes a transmitter 41 configured to broadcast at least one of a first preset threshold, a second preset threshold, a third preset threshold, a fourth preset threshold, or a seventh preset threshold before the receiver 40 receives the data that is sent by the user equipment (UE) by using the unscheduled uplink data transmission resource after the UE determines that the first information does not meet the preset condition, where the first preset threshold is used to indicate a minimum value of the channel quality between the UE and the base station, the second preset threshold is used to indicate a maximum value of the channel load between the UE and the base station, the third preset threshold is used to indicate a maximum value of the size of the data to be sent by the UE, the fourth preset threshold is used to indicate a maximum value of the uplink service arrival sparseness degree of the base station, and the seventh preset threshold is used to indicate a maximum value of the quantity of times that the UE fails to send a data packet to the base station by using the unscheduled uplink data transmission resource.

Further, the transmitter 41 is further configured to broadcast a fifth preset threshold and a sixth preset threshold. The fifth preset threshold is used to indicate a minimum value of a remaining available power of the UE, and the sixth preset threshold is used to indicate a maximum value of a path loss between the UE and the base station.

This embodiment of the present application provides the base station including the receiver configured to receive the data that is sent by the user equipment (UE) by using the unscheduled uplink data transmission resource after the UE determines that the first information does not meet the preset condition, where the first information includes at least one of the location information of the UE, the channel quality between the UE and the base station, the channel load between the UE and the base station, the size of the data to be sent by the UE, or the uplink service arrival sparseness degree of the base station.

Based on the foregoing description of this embodiment, the UE can directly obtain the unscheduled uplink data transmission resource, instead of using a random access scheme to perform a large quantity of signaling interactions with the base station, so that fewer network resources are used and transmission efficiency is improved.

Embodiment 8

This embodiment of the present application provides a data transmission system, including the UE according to any implementation of Embodiment 4 and the base station according to any implementation of Embodiment 5.

Embodiment 9

This embodiment of the present application provides a data transmission system, including the UE according to any implementation of Embodiment 6 and the base station according to any implementation of Embodiment 7.

It may be clearly understood by persons skilled in the art that, for the purpose of convenient and brief description, division of the foregoing function modules is used as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present application may be integrated into one processing unit, or each of the units may exist alone physically, or two or more units are integrated into one unit. The foregoing integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or a part of the technical solutions may be implemented in the form of a software product. The computer software product is stored in a storage medium and includes several instructions for instructing a computer device (which may be a personal computer, a server, a network device, or the like) or a processor to perform all or some of the steps of the methods described in the embodiments of the present application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of the present application, but are not intended to limit the protection scope of the present application. Any variation or replacement readily figured out by persons skilled in the art within the technical scope disclosed in the present application shall fall within the protection scope of the present application. Therefore, the protection scope of the present application shall be subject to the protection scope of the claims.

What is claimed is:

1. A method performed by user equipment (UE), the method comprising:
   receiving a broadcast message indicating a first threshold from a base station;
   obtaining a path loss between the UE and the base station, and a random number generated by the UE; and
   in response to the path loss not greater than the first threshold and the random number greater than a random number threshold, sending data to the base station using an unscheduled resource for uplink data transmission, wherein the unscheduled resource is a resource used for a physical uplink shared channel and the unscheduled resource is allocated by a system broadcast message or a dedicated message.

2. The method according to claim 1, further comprising, in response to a quantity of times that the UE fails to send the data to the base station using the unscheduled resource being lower than a second threshold, sending, by the UE, the data to the base station using the unscheduled resource.

3. The method according to claim 2, wherein the broadcast message further indicates the second threshold.

4. The method according to claim 1, further comprising:
   in response to the path loss being greater than the first threshold:
      sending a random preamble sequence to the base station; and
      receiving a scheduled resource; and
      sending the data to the base station using the scheduled resource.

5. An apparatus, which is user equipment (UE) or is applicable in the UE, comprising:
   at least one processor; and
   a non-transitory memory storing a program executable by the at least one processor, wherein the program comprises instructions for:
      receiving a broadcast message indicating a first threshold from a base station;
      obtaining a path loss between the UE and the base station, and a random number generated by the UE; and
      sending, in response to the path loss not greater than the first threshold and the random number greater than a random number threshold, data to the base station using an unscheduled resource for uplink data transmission, wherein the unscheduled resource is a resource used for a physical uplink shared channel and the unscheduled resource is allocated by a system broadcast message or a dedicated message.

6. The apparatus according to claim 5, wherein the program further comprises instructions for:
   in response to a quantity of times that the UE fails to send the data to the base station using the unscheduled resource being lower than a second threshold, sending the data to the base station using the unscheduled resource.

7. The apparatus according to claim 6, wherein the broadcast message further indicates the second threshold.

8. The apparatus according to claim 5, wherein the program further comprises instructions for:
   in response to the path loss being greater than the first threshold, sending a random preamble sequence to the base station;
   receiving a scheduled resource; and sending the data to the base station using the scheduled resource.

9. A non-transitory computer-readable medium having stored a computer program comprising at least one code section, the at least one code section being executable by one or more processors, and when executed, causing the one or more processors to:

receive a broadcast message indicating a first threshold from a base station;

obtain a path loss between user equipment (UE) and the base station, and a random number generated by the UE; and in response to the path loss not greater than the first threshold and the random number greater than a random number threshold, send data to the base station using an unscheduled resource for uplink data transmission, wherein the unscheduled resource is a resource used for a physical uplink shared channel and the unscheduled resource is allocated by a system broadcast message or a dedicated message.

10. The non-transitory computer-readable medium according to claim 9, wherein the at least one code section further causes the one or more processors to, in response to a quantity of times that the UE fails to send the data to the base station using the unscheduled resource being lower than a second threshold, send the data to the base station using the unscheduled resource.

11. The non-transitory computer-readable medium according to claim 10, wherein the broadcast message further indicates the second threshold.

12. The non-transitory computer-readable medium according to claim 9, wherein the at least one code section further causes the one or more processors to:

in response to the path loss being greater than the first threshold, send a random preamble sequence to the base station;

receive a scheduled resource from the base station; and send the data to the base station using the scheduled resource.

* * * * *